UNITED STATES PATENT OFFICE.

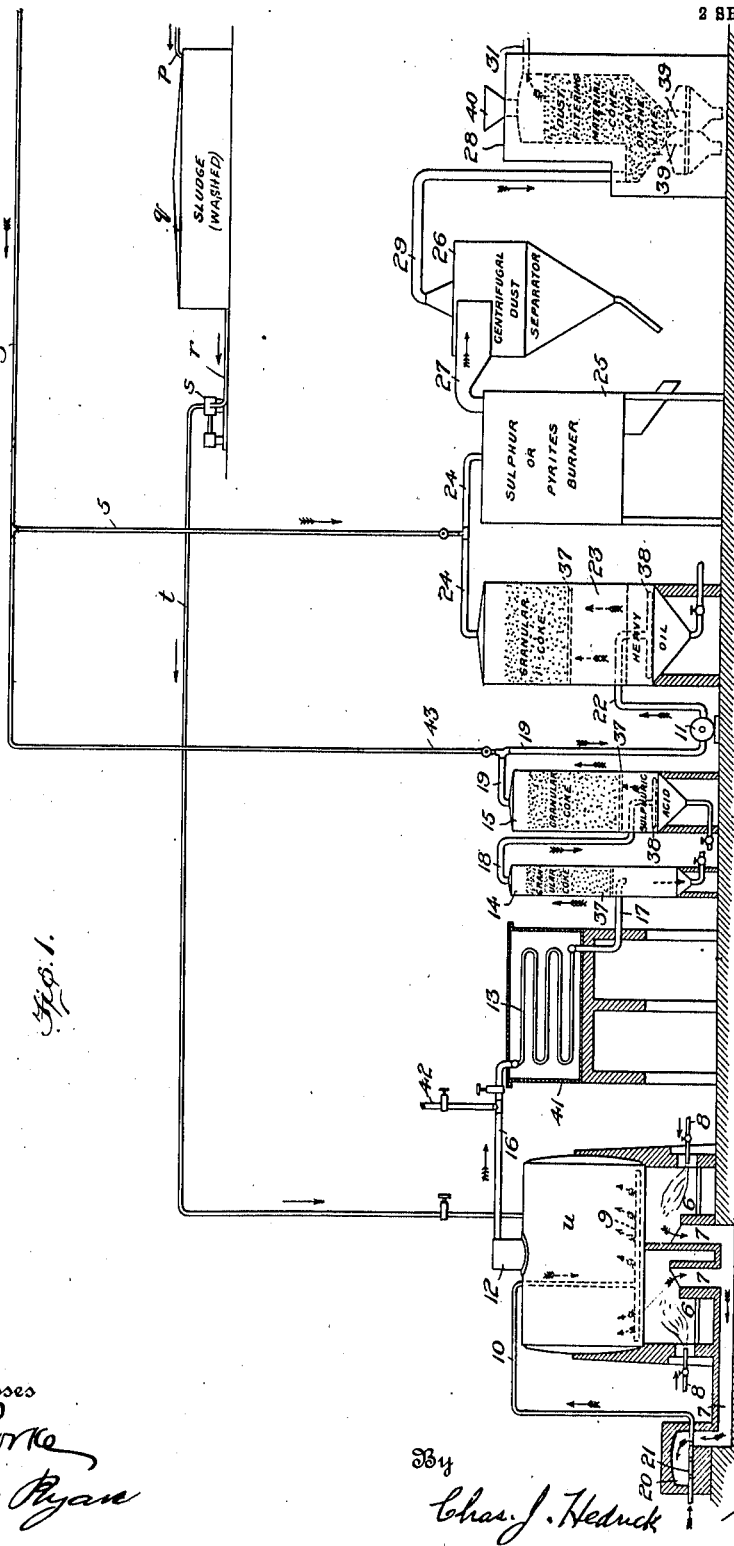

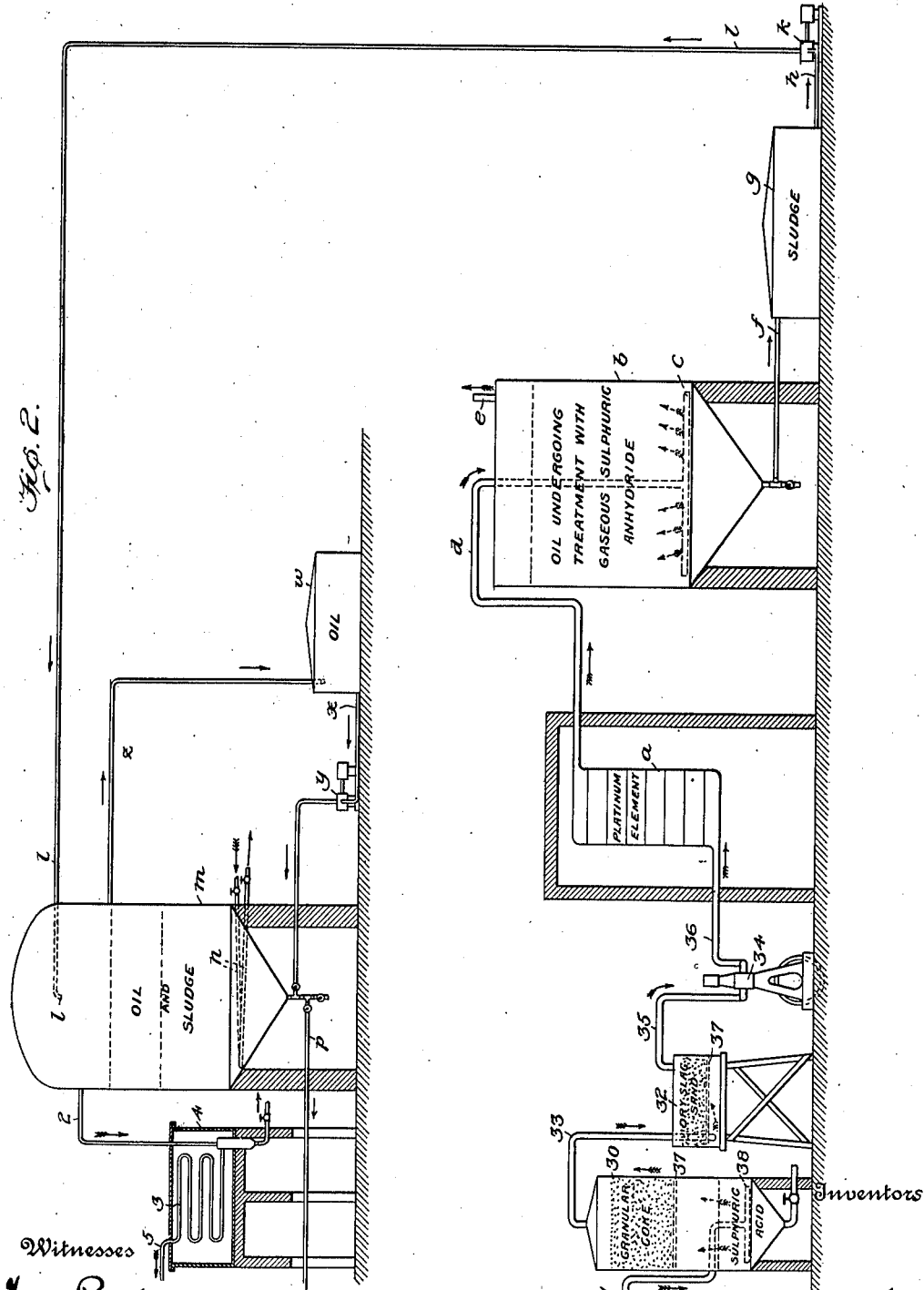

JOHN C. BLACK AND MARVIN L. CHAPPELL, OF RICHMOND, CALIFORNIA, ASSIGNORS TO STANDARD OIL COMPANY, OF RICHMOND, CALIFORNIA, A CORPORATION OF CALIFORNIA.

UTILIZING ACID SLUDGE FROM REFINING PETROLEUM.

1,031,413.      Specification of Letters Patent.      Patented July 2, 1912.

Application filed October 21, 1910. Serial No. 588,321.

*To all whom it may concern:*

Be it known that we, JOHN C. BLACK and MARVIN L. CHAPPELL, both of us citizens of the United States, and residents of Richmond, in the county of Contra Costa and State of California, have invented certain new and useful Improvements in Utilizing Acid Sludge from Refining Petroleum, of which improvements the following is a specification.

This invention relates more particularly to the utilization for making sulfuric anhydrid of the sulfur content of the oily liquid, heavier than petroleum and black or brown in color, which is formed when petroleum in the form of burning oil (kerosene) distillate or in other form, is brought into intimate contact with sulfuric acid of appropriate strength or with sulfuric anhydrid. When the mixture is allowed to stand, this liquid, known as acid sludge, settles out and can be drawn off from below the refined oil. But each of the improvements composing the invention is intended to be secured for all the uses to which it can be applied with or without modification.

Upon heating to appropriate temperature, acid sludge decomposes with liberation of sulfur dioxid and other aeriform products;
and a process has heretofore been devised in which the aeriform products of such decomposition, after cooling to separate the readily condensable constituents (hydrocarbons) and burning to remove the remaining combustible constituents, and also after removal of the water vapor formed by said burning and the supply (in or after said burning) of the air needed for conversion of the sulfur dioxid into sulfuric anhydrid, are passed over catalytic material in the known way for making sulfuric anhydrid, the acid sludge having been heated by itself to upward of 500° F. in order to effect its said decomposition. Upon treating California petroleum in the form of burning oil distillate with fuming sulfuric acid or anhydrid and subjecting the resulting acid sludge to this prior process, the yield of sulfuric anhydrid (in our experience) has represented only about one-half of the sulfur content of the decomposed sludge; and in the light of our investigations and of the known fact that the yield of sulfuric anhy-
drid by the catalytic method is reduced when the percentage of sulfur dioxid in the gases to be catalyzed is unduly small, we attribute said small yield to the large proportion of combustible and not readily condensable constituents (hydrogen sulfid and sulfured and unsulfured hydrocarbons) in the aeriform products which result from decomposing the acid sludge as heretofore proposed. Said constituents require so much air to effect their combustion that the percentage of sulfur dioxid in the gases prepared for the catalyzing operation is too small (as we believe) to allow the conversion of more than about half of it into sulfuric anhydrid. The amount of carbon dioxid present may also be a not unimportant factor in reducing the yield. Other forms of acid sludge, as that from treating said California distillate with non-fuming sulfuric acid; or from treating California petroleum in other forms, or from treating other petroleum in any form with fuming or non-fuming sulfuric acid or with sulfuric anhydrid, may or may not evolve as great a proportion of combustible and not readily condensable constituents; but we believe that in most cases, if not universally, sufficient of these constituents would be evolved to produce an undesirable dilution or contamination or both of the gases to be catalyzed.

By the aid of the present invention, starting with acid sludge from treating said California distillate with fuming sulfuric acid or with sulfuric anhydrid, we have obtained a yield of sulfuric anhydrid nearly, if not quite, as large in proportion to the sulfur content of the starting material as that obtained (say about 95 per cent.) in the current manufacture of sulfuric anhydrid by passage over catalytic material of the gases from the combustion of elementary sulfur or of pyrites in an appropriate excess of air. By aid of the invention we have also obtained other important advantages, as hereinafter set forth.

In accordance with the present invention, acid sludge is heated in the presence of air which is brought into contact with the liquid sludge in process of decomposition at appropriate temperatures, with the result (as we have discovered) that the liberation of hydrogen sulfid and of sulfured hydrocarbons can be substantially reduced, if not practically prevented, without corresponding (if any substantial) formation of water and carbon dioxid and without increase (but with a diminution, in fact) of unsulfured and not readily condensable hydrocarbons. The air is best introduced into the liquid sludge. Further, by heating said sludge in presence of air as aforesaid the decomposition of said sludge can be effected (as we have discovered) at lower temperatures than those required when the said sludge is heated by itself; and in the present invention, therefore, the acid sludge, at least during collection of sulfur dioxid for catalytic conversion into sulfuric anhydrid, is kept at such comparatively low temperatures (say, best not above 350° F.). Thus the formation is reduced of hydrocarbons not readily condensable. When heated by itself, said sludge has (in our experience) to be raised to above 425° F. in order to get off as much as 50 per cent. of its sulfur content which is available for the formation of $SO_3$; while over 85 per cent. of such sulfur content can be driven off by heating as aforesaid in presence of air without exceeding about 350° F. Also, in accordance with the present invention, the aeriform products from decomposing acid sludge are passed (best after cooling to separate the readily condensable constituents therefrom) in contact with a solvent of highly volatile hydrocarbons, which solvent is not volatile under the conditions of its employment, best a hydrocarbon oil of higher boiling point than burning oil (kerosene) and free from light products, say a petroleum distillate of 28° B. or heavier gravity and a flash point of 212° F. or over, or a reduced crude oil of similar gravity and flash; and hydrocarbons which are not readily condensable are thus removed from said aeriform products. Moreover, before the acid sludge is subjected to the principal decomposing operation, it is heated sufficiently to effect the decomposition of its more readily decomposable sulfur compounds and is washed (best while said decomposition is taking place) with a solvent of hydrocarbons, which solvent will separate from the sludge by gravity, best a light oil, such as petroleum naphtha; so that the hydrocarbon components of the so decomposed sulfur compounds are preliminarily removed by the solvent and do not remain in the sludge to break up at the higher temperatures subsequently employed into bodies which are not readily condensable. An advantage in using a light oil is that it can be distilled off from the hydrocarbons in solution therein, after decanting from the sludge.

The features mentioned are best used all of them in combination as parts of one process of making sulfuric anhydrid by catalytic conversion of sulfur dioxid derived from acid sludge; and we have invented also an apparatus, hereinafter described, for performing such process; but the invention includes not only said process and apparatus, each of them as a whole, but also all and singular the new, useful and original parts, improvements and lesser combinations herein disclosed, as well of process as of apparatus.

Figures 1 and 2 of the accompanying drawing, taken together, constitute a diagram of a plant for making sulfuric anhydrid in accordance with the invention and for using the so made sulfuric anhydrid to treat petroleum in accordance with the invention of John C. Black, above named, described and claimed in his patent of August 30, 1910, No. 968,640, the resulting sludge being utilized in making more sulfuric anhydrid to be used as aforesaid all in one cycle of operations; but the sulfuric anhydrid made from the acid sludge can be used as may be desired; and the acid sludge to be utilized may result from any desired treatment of petroleum. The appliances in the upper parts of the two figures would in use be at the level of those in the lower parts of said figures; although they could be located above them, if preferred.

As shown, the sulfuric anhydrid from the catalyzing element $a$ (say a platinum element) is introduced in its original gaseous state of catalytic formation and in admixture with diluent gas into the petroleum to be treated in the agitator $b$ through the perforated coil $c$ immersed in said petroleum and located at the end of pipe $d$. Reaction takes place in the agitator between the petroleum and the gaseous sulfuric anhydrid, with formation of acid sludge. The diluent gas, with such aeriform bodies as may accompanying it is carried off by the vent pipe $e$ leading to any desired point.

After a charge of oil has been treated, the sludge is allowed to settle; and it is then drawn off by the pipe $f$ into a storage tank $g$, the gaseous sulfuric anhydrid being directed into another agitator which has been supplied with a charge of oil; or it is directed elsewhere, if so desired. From tank $g$ the sludge is supplied by pipe $h$ to pump $k$; which delivers it by pipe $l$ into the preliminary decomposer and washer $m$. After a charge of sludge has been supplied to this latter, said charge is heated by the close steam coil $n$ to a sufficient temperature to decompose the readily decomposable sulfur compounds, say to from 130° F. to 150° F. At the same time the sludge is washed with gasolene or other liquid which is a solvent of hydrocarbons and is light in gravity as compared with the acid sludge so that the two will separate on standing. The washing may be performed in any known or suitable way. A charge of the solvent liquid can be added to the charge of sludge in vessel *m*; the two can then be mixed together by air or by stirring devices until the washing and partial decomposition are complete; the whole can be allowed to stand; and the washed and partly decomposed sludge can be drawn off by pipe *p* from under the lighter liquid and be delivered into storage tank *q*; from which it is supplied by pipe *r* to pump *s*; which delivers it through pipe *t* into the main decomposing vessel *u*. It is also possible to heat the acid sludge by itself in vessel *m* in order to effect a partial decomposition as aforesaid and then to wash the residual sludge in the same or in another vessel in order to remove liquid hydrocarbons from said residual sludge before charging it into the vessel *u*; but it is considered more advantageous to effect the washing concurrently with such partial decomposition. As shown, the gasolene or other solvent liquid withdrawn from tank *w* through pipe *x* is delivered by pump *y* into the bottom of vessel *m*; it rises through the sludge, carrying with it the hydrocarbons dissolved thereby; and it returns through pipe *z* to the tank *w*. When air is used for agitating the quantity should not be so great as unduly to dilute the sulfur dioxid given off from the acid sludge.

At the temperature in the vessel *m* the readily decomposable sulfur compounds are broken up, with formation of sulfur dioxid which passes out by the pipe 2 and hydrocarbons which dissolve in the solvent liquid. Oil composed of these hydrocarbons can be obtained by separating them from the solvent liquid. If gasolene is used as such liquid, it can be distilled off from the hydrocarbons. The solvent liquid is withdrawn as it becomes charged to the desired extent with dissolved hydrocarbons; and fresh liquid is supplied.

The gaseous sulfur dioxid is passed through condenser coil 3 in tank 4, which is kept full of cold water, to separate any hydrocarbons which may have passed over with the sulfur dioxid in liquid or in vapor form. It then passes on by pipe 5 to join the main stream of sulfur dioxid from the decomposition of the sludge in the vessel *u*. This vessel *u* (which may be of iron) is arranged to be heated and is provided with means for introducing air into the liquid space. As shown it is horizontally disposed and is of cylindrical or, better, of somewhat elliptical form in vertical cross section, the major axis of the ellipse being vertical so as to allow more room for foaming without increasing the horizontal diameter of the vessel. It is mounted over the fire boxes 6 having flues 7 for escape of the products of combustion and pipes 8 for supplying liquid or gaseous fuel; or solid fuel can be used.

At the bottom of the vessel is the perforated distributing pipe 9 at the end of the air pipe 10.

Air is best drawn into the vessel *u* by exhaustion produced say by a rotary blower 11; with which the dome 12 of said vessel *u* is connected through the condensing coil 13 and scrubbers 14 and 15 and the intervening pipes 16, 17, 18, 19. The air may be taken in at atmospheric temperature; but it is advantageous to heat it preliminarily to the temperature of the sludge in vessel *u* in order to relieve the bottom of vessel *u* of the duty of supplying the heat which cooler air would take from the sludge. Such preliminary heating can be effected without extra expense for fuel by using the gases from flues 7 in the air heater 20, in which a heating coil 21 connected with the air pipe 10 is shown.

The outlet of blower 11 is connected by pipe 22 with the scrubber 23; and the outlet of the latter is connected by pipe 24 with a sulfur or pyrites burner 25; between which and the platinum element *a* are shown a cyclonic or centrifugal dust separator 26 (connected by pipe 27 with the burner 25), a dust filter 28 (connected by pipe 29 with the outlet from the centrifugal separator 26), a scrubber 30 (connected by pipe 31 with the outlet of filter 28), a filter 32 for liquid particles in suspension (connected by pipe 23 with the outlet of scrubber 30), and a pump 34 (connected by pipe 35 with the outlet of filter 32 and having a pipe 36 leading from its own outlet to the platinum element *a*). The series of appliances between the burner 25 and the platinum element *a* may be of any known or suitable description adapted to prepare the products of combustion of sulfur or pyrites in air for catalyzing and including means for removing water vapor from said products; but the series shown is as well adapted for the purposes of the present invention as any with which we are acquainted. The platinum element may be fitted with a pre-filter, if desired, and also with a pre-heater, depending upon the type of platinum element.

The scrubbers 14, 15, 23 and 30 have each of them a body of granular coke or other like material in their upper parts for removing liquid particles in suspension from the aeriform fluids, said material resting on a perforated floor or grating 37. The filter 32 has a bed of dry slag sand (a known material for the purification of gases to be catalyzed); which rests also on a perforated floor or grating 37. The scrubbers 15, 23 and 30 have each of them a liquid space at the bottom and a perforated distributing coil 38 in said space at the end of the pipe 18, 22, or 31, respectively, connecting the scrubbers with the outlet of the preceding vessel of the series; so that the vapors and gases bubble up through such liquid. The liquid in scrubbers 15 and 30 is concentrated sulfuric acid, that in the scrubber 23 is a liquid (say a petroleum distillate of 28° B. or heavier gravity with a flash point of 212° F. or more, or reduced crude petroleum of such gravity and flash) which is a solvent of hydrocarbons that are not readily condensable.

In the dust filter 28 the filling of coke, lava or the like rests upon dumping grates 39; so that material at and near the bottom can be removed from time to time, as the dust collects thereon. New material is then supplied through the hopper 40 at the top. The condenser coil 13 is inclosed in tank 41; which is kept full of cold water.

In filling the vessel $u$ with sludge the upper third at least would best be left vacant for reception of foam. The vessel and its charge of sludge are gradually raised in temperature with admission of air of about equal temperature with the liquid sludge through the coil 21, pipe 10 and distributer 9. The heating of vessel $u$ is so regulated as to obtain a good stream of aeriform products; and the air is best regulated so that the gases prepared for catalyzing (that is, after leaving the filter 32 as shown) will contain by volume about one and a half times to twice as much free oxygen as of sulfur dioxid. In practice a number (say five) of the vessels $u$ (preferably each with its own condensing coil 13) would be connected by a manifold with one purifying system; and these vessels $u$ would be charged in rotation at such intervals that the charges could be worked contemporaneously (except, of course, while a vessel would be emptied and re-supplied with sludge), but with the several charges at different stages of the run. In this way a stream of sulfur dioxid, oxygen, nitrogen and carbon dioxid can be obtained uniform, or nearly uniform, both in composition and in quantity supplied per unit of time. The endeavor should be to maintain a composition by volume of 8 to 10 per cent. sulfur dioxid and 14 to 15 per cent. oxygen. If necessary, or desired, air can be introduced into the system at any point before the scrubber 30; or, if the air is free from water vapor, it can be introduced subsequently. The maintenance of a partial vacuum in vessel $u$, as by the suction of the blower 11, is considered advantageous; but it is not essential to good results. The vacuum in the vessel $u$ may well be that required to draw the desired proportion of air into and through the acid sludge therein; but the invention is not restricted in this regard. The vacuum is believed to have the effect of lowering the temperature of the decomposition as well as of inducing an inflow of air.

When the contents of any vessel $u$ attains a temperature of about 350° F. we have found that it is entirely feasible to discontinue the introduction of air into that vessel; as the decomposition will then have been effected of the sulfur compounds whose decomposition without air would produce permanent gases (or not readily condensable constituents); and when the aeriform products from any vessel $u$ contain so low a percentage of sulfur dioxid as unduly to reduce the percentage in the gases from all the vessels, the aeriform products from that vessel are disposed of otherwise or the fires under said vessel are discontinued and the vessel (when cool) is emptied and recharged with sludge. When said aeriform products from a vessel $u$ contain only about 1½ per cent. of sulfur dioxid it is considered time to cut it off from the system for making sulfuric anhydrid. The reason for considering it desirable to stop the introduction of air into the sludge in vessel $u$ at about 350° F. is that at higher temperatures chemical combinations take place between the oxygen of the air and hydrocarbons in the sludge. Possibly some such combinations occur at and below about 350° F.; but they do so (if at all) to a comparatively small extent only.

If it is desired to obtain coke the heating of the sludge residue is continued (air remaining cut off) until said residue is reduced to dryness. The aeriform products may be taken off by a branch pipe 42, the valve therein being opened, and that in pipe 16 beyond its junction with pipe 42 being closed. The quality of the coke thus obtained is believed to be improved by the fact that sludge has been decomposed in presence of air in contact with the liquid sludge undergoing decomposition, probably by reason of the freedom of said coke from products which would be formed by heating the sludge by itself to the higher temperatures then needed to effect decomposition of the sulfur compounds. The oils obtained during the heating with introduction of air are more in quantity and better in quality than would be obtained by heating the sludge by itself; because, for one reason at least, they are given off at lower temperatures and with less decomposition. The preliminary partial decomposition and washing of the sludge are believed to improve the quality of the coke and of the oils, as well as of the aeriform products.

More than one air pipe may well be provided for each vessel $u$; and each such pipe may advantageously pass through a stuffing box on the top of the vessel $u$; so that it can be drawn up out of the sludge residue when the introduction of air is stopped and thus not be in the way in cleaning out the vessel. Even without a distributer on its outlet end, a pipe discharging air into the sludge would be effective within a certain radius in bringing air into contact with the sludge undergoing decomposition.

The mixture of aeriform products from vessel $u$, while said mixture is suitably rich in sulfur dioxid, is cooled in coil 13 to separate condensable constituents (mainly hydrocarbons and water). It is deprived of liquid particles in suspension by passage through the granular coke or other like material in the upper part of scrubber 14. It is dried by the concentrated sulfuric acid in the lower part of scrubber 15 and freed from entrained particles of liquid in passing through the granular coke or other like material in the upper part of this scrubber. In the lower part of scrubber 23 it is subjected to contact with the heavy petroleum distillate or reduced crude oil to separate the previously uncondensed hydrocarbons absorbable therein; and it is freed from entrained particles of liquid by passage through the granular coke or other like material in the upper part of the scrubber. In the pipe 24 it is joined by the aeriform products from condensing coil 3; or these products (passing through branch pipe 43) can be united to it in pipe 19. In burner 25 the mixture is heated to combustion temperature to burn whatever combustible constituents there may be in it, air sufficient to effect the combustion being present. And finally after separation of dust, by centrifugal action in separator 26, and by filtering through coke, lava or other suitable dust filtering material in filter 28 and of water by passage through concentrated sulfuric acid in the lower part of scrubber 30 (with removal of entrained particles of liquid by passage through the granular coke or other like material in the upper part of scrubber 30 and also through the dry slag sand of filter 32) the purified gaseous mixture is passed at appropriate temperature under any known or suitable conditions through the platinum element $a$ or a number of such elements arranged as may be desired (or the purified aeriform products may be passed over any suitable catalytic substance) for the conversion of the sulfur dioxid therein into sulfuric anhydrid.

The loss of sulfur which occurs in a cycle of operations can be supplied by the elementary sulfur or pyrites which is burned in burner 25; or more than enough elementary sulfur or pyrites than is required to supply such loss can be burned in said burner, and part of the resulting sulfuric anhydrid be taken off for other uses. Should it not be desired to use a sulfur or pyrites burner, the aeriform products from scrubber 23 could be passed through pipes heated to the temperature of ignition so as to effect a combination of the combustible constituents of said products with the oxygen in admixture therewith; and the loss in sulfur in the cycle of operations could then be supplied as might be preferred. After passage through such pipes, the aeriform fluids should be passed through scrubber 30 and dry filter 32; but the dust separators 26 and 28 would be useless. The sulfuric anhydrid can be collected and used as such, or to form fuming or non-fuming sulfuric acid or otherwise, all in any known or suitable way. The preliminary washing of the acid sludge can be omitted (if desired); but it is advantageous to use it; and it can be employed usefully should it be desired to utilize the washed sludge otherwise than as herein described.

In purifying the aeriform products from decomposing acid sludge by heat preparatory to passing the purified products over catalytic material for converting the sulfur dioxid therein into sulfuric anhydrid, while it is considered that the best results are attained by the application of the following purifying operations, at least to the aeriform products from decomposing the main part of said sludge, namely: (1) cooling to separate readily condensable constituents, (2) contact with sulfuric acid to separate water vapor, (3) contact with a solvent of hydrocarbons that are not readily condensable to remove the constituents absorbable by said solvent, (4) heating to combustion temperature in presence of air to burn the combustible constituents, and (5) contact with sulfuric acid to separate water vapor, yet, if the results would be satisfactory, any one or more of said operations can be omitted or be replaced by other operations of a similar character, and the order of operations is not necessarily invariable. Operation numbered (3) might, for example, precede that numbered (2). Additional purifying operations can be used, if desired.

The heating of the acid sludge under a partial vacuum or sub-atmospheric pressure, and the heating of it in a vessel of horizontal tubular form, elliptical in cross section with the major axis vertical, would (either or both of them) be useful should it be desired to decompose acid sludge without the introduction of air into contact with the sludge undergoing decomposition, and so in such case would the introduction into the decomposing vessel of air above the liquid sludge or of a non-oxidizing aeriform fluid either above or below or partly above and partly below the surface of said liquid; but the main advantage of using air is only obtained by bringing it into contact with the liquid sludge undergoing decomposition; and this is best effected by discharging it into the liquid sludge. If the air were delivered into the vessel $u$ above the sludge, its contact with the aeriform products would, of course, have no effect in preventing the reduction of sulfur groups in the sludge which would already have been decomposed in the absence of oxygen and would consequently have resulted in the formation of hydrogen sulfid and sulfured hydrocarbons that are not readily condensable. So, too, it would have little effect, if any, in lowering the temperature at which the sludge should decompose. In fact, the oxidizing action of the air in contact with the liquid sludge undergoing decomposition is of the greatest importance. If not prohibitive on the score of expense, other forms of oxygen can be used in place of air. The expression, therefore, of air in the hereinafter written claims is intended to include by extension any available form of oxygen.

The sulfur dioxid obtained by decomposing acid sludge and purifying the resulting aeriform mixture as herein set forth up to its passage over catalytic material (or by the aid of any part of such operations) can be utilized otherwise than for the catalytic formation of sulfuric anhydrid. It can be used, for example, in the manufacture of sulfuric acid in lead chambers or of sulfite and bisulfite salts, and so on. Other modifications can be made.

So far as we are aware, we are the first to operate as herein set forth on any material which is largely (if not wholly) composed of oily substances and sulfuric acid or anhydrid or of products resulting from the interaction of oily substances and sulfuric acid or anhydrid, and which consequently evolves sulfuric dioxid in utilizable quantity at temperatures below 500° F. It is believed that operations of the character of those herein above set forth can beneficially be applied to other materials of this description as well as to acid sludge from refining petroleum. While, therefore, the "acid sludge" of the hereinafter written claims is primarily this latter material, it includes by extension the former also. Acid sludges, it may be observed, have heretofore been obtained in treating oily substances of various descriptions with sulfuric acid or anhydrid, as, for example, in treating hydrocarbon oils of other than petroleum origin, fatty oils, resins, waxes, and the like; and mixtures of oily substances and sulfuric acid or anhydrid can, of course, be made. A mixture, for example, of petroleum and sulfuric acid has been proposed for the manufacture of a special carbon or coke therefrom by heating the same to a high temperature. Also, as far as we are aware, we are the first to purify aeriform products, evolved at temperatures below 500° F. from any material which has a large content of sulfur and is largely at least composed of oily substances, by subjecting the so evolved aeriform products to purifying operations which include contact of the same with a solvent of hydrocarbons that are not readily condensable, in order to separate from said products constitutents absorbable by such solvent. It is believed that such purifying operations can beneficially be applied to aeriform products evolved below 500° F. from other oily material of large sulfur content, as well as from acid sludge from refining petroleum. It is also believed that such other material to which said operations can beneficially be applied need not necessarily have its sulfur content in the form which the sulfur has in sulfuric acid or anhydrid or in products of the interaction of oily substances and sulfuric acid or anhydrid. While, therefore, the "sulfur bearing oily material" of the hereinafter written claims, in which such material is recited, is primarily acid sludge from refining petroleum, and includes by extension other material which is composed largely (if not wholly) of oily substances and sulfuric acid or anhydrid or of products of the interaction of oily substances and sulfuric acid or anhydrid, it is also intended by further extension to include other known or suitable oily material which has a large content of sulfur and evolves aeriform products below 500° F.

We claim as our invention or discovery:

1. The process of utilizing the sulfur content of acid sludge for making sulfuric anhydrid, by subjecting the sludge to contact with air at a decomposing temperature, purifying the resulting aeriform products, and passing the purified products over catalytic material for converting the sulfur dioxid therein into sulfuric anhydrid, substantially as described.

2. The process of utilizing the sulfur content of acid sludge for making sulfuric anhydrid, by subjecting the sludge to a decomposing temperature in the presence of air introduced into a body of the liquid sludge below the surface thereof, purifying the resulting aeriform products, and passing the purified products over catalytic material for converting the sulfur dioxid therein into sulfuric anhydrid, substantially as described.

3. The process of utilizing the sulfur content of acid sludge for making sulfuric anhydrid, by decomposing the sludge in contact with air at a temperature not above 425° F., purifying the resulting aeriform products, and passing the purified products over catalytic material for converting the sulfur dioxid therein into sulfuric anhydrid, substantially as described.

4. The process of utilizing the sulfur content of acid sludge for making sulfuric anhydrid, by heating the sludge to effect its decomposition, subjecting the resulting aeriform products to purifying operations which include contact with a solvent of hydrocarbons that are not readily condensable in order to remove constituents absorbable by said solvent, and passing the purified products over catalytic material for converting the sulfur dioxid therein into sulfuric anhydrid, substantially as described.

5. The process of utilizing the sulfur content of acid sludge for making sulfuric anhydrid, by heating the sludge to effect a partial decomposition of it, washing liquid hydrocarbons out of the residual sludge, heating the latter to effect its decomposition purifying the aeriform products from at least the latter decomposition, and passing the purified products over catalytic material for converting sulfur dioxid into sulfuric anhydrid, substantially as described.

6. The process of utilizing the sulfur content of acid sludge for making sulfuric anhydrid, by heating the sludge in presence of a solvent of hydrocarbons to effect a partial decomposition of said sludge, separating said solvent with the hydrocarbons in solution therein from the residual sludge, heating the latter to effect its decomposition, purifying the aeriform products from at least the latter decomposition, and passing the purified products over catalytic material for converting sulfur dioxid into sulfuric anhydrid, substantially as described.

7. The process of utilizing the sulfur content of acid sludge for making sulfuric anhydrid, by heating the sludge in presence of a solvent of hydrocarbons to effect a decomposition of said sludge, purifying the resulting aeriform products, and passing the purified products over catalytic material for converting the sulfur dioxid therein into sulfuric anhydrid, substantially as described.

8. The process of utilizing the sulfur content of acid sludge for making sulfuric anhydrid, by heating the sludge in presence of a solvent of hydrocarbons to effect a decomposition of said sludge, withdrawing the solvent during said decomposition and with it the hydrocarbons in solution therein, purifying the aeriform products of the decomposition, and passing the purified products over catalytic material for converting the sulfur dioxid therein into sulfuric anhydrid, substantially as described.

9. The process of utilizing the sulfur content of acid sludge, by subjecting the sludge to contact with air at a decomposing temperature and the resulting aeriform products to operations for purifying the same and for utilizing sulfur dioxid therein, substantially as described.

10. The process of utilizing the sulfur content of acid sludge, by subjecting the sludge to a decomposing temperature in the presence of air introduced into a body of the liquid sludge below the surface thereof and the resulting aeriform products to operations for purifying the same and for utilizing sulfur dioxid therein, substantially as described.

11. The process of utilizing the sulfur content of acid sludge, by decomposing the sludge in contact with air and at a temperature not above 425° F., and subjecting the resulting aeriform products to operations for purifying the same and for utilizing sulfur dioxid therein, substantially as described.

12. The process of utilizing the sulfur content of acid sludge, by heating the sludge to effect its decomposition, and subjecting the resulting aeriform products to operations for purifying the same and for utilizing sulfur dioxid therein, which operations include contact with a solvent of hydrocarbons that are not readily condensable in order to remove constituents absorbable by said solvent, substantially as described.

13. The process of utilizing the sulfur content of acid sludge, by heating the sludge sufficiently to effect a partial decomposition of it, washing liquid hydrocarbons out of the residual sludge, heating the latter to effect its decomposition, and subjecting the aeriform products from at least the latter decomposition to operations for purifying the same and for utilizing sulfur dioxid therein, substantially as described.

14. The process of utilizing the sulfur content of acid sludge, by heating the sludge in presence of a solvent of hydrocarbons to effect a partial decomposition of said sludge, separating said solvent with the hydrocarbons in solution therein from the residual sludge, heating the latter to effect its decomposition, and subjecting the aeriform products from at least the latter decomposition to operations for purifying the same and for utilizing sulfur dioxid therein, substantially as described.

15. The process of utilizing the sulfur content of acid sludge, by heating the sludge in presence of a solvent of hydrocarbons to effect a decomposition of said sludge, and subjecting the resulting aeriform products to operations for purifying the same and for utilizing sulfur dioxid therein, substantially as described.

16. The process of utilizing the sulfur content of acid sludge, by heating the sludge in presence of a solvent of hydrocarbons to effect a decomposition of said sludge, withdrawing the solvent during said decomposition and with it the hydrocarbons in solution therein, and subjecting aeriform products of said decomposition to operations for purifying the same and for utilizing sulfur dioxid therein, substantially as described.

17. The process of making sulfur dioxid, by subjecting acid sludge to contact with air at a decomposing temperature and the resulting aeriform products to operations for purifying the same, and collecting the purified products in a manner appropriate for utilizing their content of sulfur dioxid, substantially as described.

18. The process of making sulfur dioxid, by subjecting acid sludge to a decomposing temperature in the presence of air introduced into a body of the liquid sludge below the surface thereof and the resulting aeriform products to operations for purifying the same, and collecting the purified products in a manner appropriate for utilizing their content of sulfur dioxid, substantially as described.

19. The process of making sulfur dioxid, by decomposing acid sludge in contact with air at a temperature not above 425° F., subjecting the resulting aeriform products to operations for purifying the same, and collecting the purified products in a manner appropriate for utilizing their content of sulfur dioxid, substantially as described.

20. The process of making sulfur dioxid, by heating acid sludge to effect its decomposition, subjecting the resulting aeriform products to purifying operations, which include contact with a solvent of hydrocarbons that are not readily condensable in order to remove constituents absorbable by said solvent, and collecting the purified products in a manner appropriate for utilizing their content of sulfur dioxid, substantially as described.

21. The process of making sulfur dioxid, by heating acid sludge to effect a partial decomposition of it, washing the liquid hydrocarbons out of the residual sludge, heating the latter to effect its decomposition, subjecting the aeriform products from at least the latter decomposition to operations for purifying the same, and collecting the purified products in a manner appropriate for utilizing their content of sulfur dioxid, substantially as described.

22. The process of making sulfur dioxid, by heating acid sludge in presence of a solvent of hydrocarbons to effect a partial decomposition of said sludge, separating said solvent with the hydrocarbons in solution therein from the residual sludge, heating the latter to effect its decomposition, subjecting the aeriform products from at least the latter decomposition to operations for purifying the same, and collecting the purified products in a manner appropriate for utilizing their content of sulfur dioxid, substantially as described.

23. The process of making sulfur dioxid, by heating acid sludge in presence of a solvent of hydrocarbons to effect a decomposition of said sludge, subjecting the resulting aeriform products to operations for purifying the same, and collecting the purified products in a manner appropriate for utilizing their content of sulfur dioxid, substantially as described.

24. The process of making sulfur dioxid, by heating acid sludge in presence of a solvent of hydrocarbons to effect a decomposition of said sludge, withdrawing the solvent during said decomposition and with it the hydrocarbons in solution therein, subjecting the aeriform products of the decomposition to operations for purifying the same, and collecting the purified products in a manner appropriate for utilizing their content of sulfur dioxid, substantially as described.

25. The process of making sulfur dioxid, by subjecting acid sludge to contact with air at a decomposing temperature, and collecting the resulting aeriform products in a manner appropriate for utilizing their content of sulfur dioxid, substantially as described.

26. The process of making sulfur dioxid, by subjecting acid sludge to a decomposing temperature in the presence of air introduced into a body of the liquid sludge below the surface thereof, and collecting the resulting aeriform products in a manner appropriate for utilizing their content of sulfur dioxid, substantially as described.

27. The process of making sulfur dioxid, by decomposing acid sludge in contact with air at a temperature not above 425° F., and collecting the resulting aeriform products in a manner appropriate for utilizing their content of sulfur dioxid, substantially as described.

28. The process of making sulfur dioxid, by heating acid sludge to effect a partial decomposition of it, washing the liquid hydrocarbons out of the residual sludge, heating the latter to effect its decomposition, and collecting the aeriform products from at least the latter decomposition in a manner appropriate for utilizing their content of sulfur dioxid, substantially as described.

29. The process of making sulfur dioxid, by heating acid sludge in presence of a solvent of hydrocarbons to effect a partial decomposition of said sludge, separating said solvent with the hydrocarbons in solution therein from the residual sludge, heating the latter to effect its decomposition, and collecting the aeriform products from at least the latter decomposition in a manner appropriate for utilizing their content of sulfur dioxid, substantially as described.

30. The process of making sulfur dioxid, by heating acid sludge in presence of a solvent of hydrocarbons to effect a decomposition of said sludge, and collecting the aeriform products of the decomposition in a manner appropriate for utilizing their content of sulfur dioxid, substantially as described.

31. The process of making sulfur dioxid, by heating acid sludge in presence of a solvent of hydrocarbons to effect a decomposition of said sludge, withdrawing the solvent during said decomposition and with it the hydrocarbons in solution therein, and collecting the aeriform products of said decomposition in a manner appropriate for utilizing their content of sulfur dioxid, substantially as described.

32. The process of separating components of acid sludge from each other, by subjecting the sludge to contact with air at a decomposing temperature, whereby aeriform products utilizable for either or both their sulfur and their hydrocarbon contents and a residue utilizable for its carbon content are obtained, substantially as described.

33. The process of separating components of acid sludge from each other, by subjecting the sludge to a decomposing temperature in the presence of air introduced into a body of the liquid sludge below the surface thereof, whereby aeriform products utilizable for either or both their sulfur and their hydrocarbon contents and a residue utilizable for its carbon content are obtained, substantially as described.

34. The process of separating components of acid sludge from each other, by decomposing the sludge in contact with air at a temperature not above 425° F., whereby aeriform products utilizable for either or both their sulfur and their hydrocarbon contents and a residue utilizable for its carbon content are obtained, substantially as described.

35. The process of separating components of acid sludge from each other, by heating the sludge to effect its decomposition, and subjecting the resulting aeriform products to operations which include contact with a solvent of hydrocarbons that are not readily condensable, whereby a mixture of aeriform fluids utilizable for its sulfur content, a liquid utilizable for its hydrocarbon content, and a residue utilizable for its carbon content are obtained, substantially as described.

36. The process of separating components of acid sludge from each other, by decomposing the sludge at a temperature too low to drive off the hydrocarbons formed by the decomposition, and washing the liquid hydrocarbons out of the residual sludge, whereby aeriform products utilizable for their sulfur content, a liquid utilizable for its hydrocarbon content, and a residue utilizable for its carbon content are obtained, substantially as described.

37. The process of separating components of acid sludge from each other, by heating the sludge in presence of a solvent of hydrocarbons to effect a decomposition of said sludge, and separating said solvent with the hydrocarbons in solution therein from the residual sludge, whereby aeriform products utilizable for their sulfur content, a liquid utilizable for its hydrocarbon content, and a residue utilizable for its carbon content are obtained, substantially as described.

38. The process of separating components of acid sludge from each other, by heating the sludge in presence of a solvent of hydrocarbons to effect a decomposition of said sludge, and withdrawing the solvent during said decomposition and with it the hydrocarbons in solution therein, whereby aeriform products utilizable for their sulfur content, a liquid utilizable for its hydrocarbon content, and a residue utilizable for its carbon content are obtained, substantially as described.

39. The process of separating components of acid sludge from each other, by partially decomposing the sludge at a temperature too low to drive off the hydrocarbons formed by the decomposition, washing the liquid hydrocarbons out of the residual sludge, and effecting a further decomposition of the latter, whereby aeriform products utilizable for their sulfur content, aeriform products utilizable for either or both their sulfur and their hydrocarbon contents, a liquid utilizable for its hydrocarbon content, and a residue utilizable for its carbon content are obtained, substantially as described.

40. The process of separating components of acid sludge from each other, by heating the sludge in presence of a liquid solvent of hydrocarbons to effect a partial decomposition of said sludge, separating said solvent with the hydrocarbons in solution therein from the residual sludge, and effecting a further decomposition of the latter, whereby aeriform products utilizable for their sulfur content, aeriform products utilizable for either or both their sulfur and their hydrocarbon contents, a liquid utilizable for its hydrocarbon content, and a residue utilizable for its carbon content are obtained, substantially as described.

41. The process of separating components of acid sludge from each other, by heating the sludge in a partial vacuum to a decomposing temperature in contact with air whereby aeriform products utilizable for either or both their sulfur and their hydrocarbon contents and a residue utilizable for its carbon content are obtained, substantially as described.

42. The process of separating components of acid sludge from each other, by heating the sludge in a partial vacuum to a decomposing temperature, whereby aeriform products utilizable for either or both their sulfur and their hydrocarbon contents, and a residue utilizable for its carbon content are obtained, substantially as described.

43. The process of separating components of acid sludge from each other, by heating the sludge in a partial vacuum to a decomposing temperature in presence of aeriform fluid introduced into the vessel wherein the decomposition is performed, substantially as described.

44. The process of separating components of acid sludge from each other, by heating the sludge to a decomposing temperature in the presence of aeriform fluid introduced into the vessel wherein the decomposition is performed, substantially as described.

45. The process of separating components of acid sludge from each other, by heating the sludge to a decomposing temperature in the presence of aeriform fluid introduced into a body of the liquid sludge below the surface thereof, substantially as described.

46. The process of separating components of acid sludge from each other, by heating the sludge to a decomposing temperature in a vessel of elliptical cross section with the major axis of the ellipse vertical, which vessel is only partly occupied by the body of sludge undergoing decomposition, so that a large space is left above said body of sludge into which the latter can rise in case of foaming, the shape of the vessel insuring a body of sludge and an overlying foam space which are each of them greater in its vertical and smaller in its horizontal dimensions than would be the case with a cylindrical vessel of equal length, area of cross section and supply of sludge, substantially as described.

47. Apparatus for utilizing the sulfur content of acid sludge for making sulfuric anhydrid, consisting of means for subjecting the sludge to contact with air at a decomposing temperature, means for purifying aeriform products from the decomposition of acid sludge, means for converting sulfuric dioxid into sulfuric anhydrid by catalysis, and connections whereby the aeriform products from the first mentioned means are delivered to said purifying means and the purified products from the latter are delivered to said catalyzing means, substantially as described.

48. Apparatus for utilizing the sulfur content of acid sludge for making sulfuric anhydrid, consisting of means for subjecting the sludge to a decomposing temperature in the presence of air introduced into a body of the liquid sludge below the surface thereof, means for purifying aeriform products from the decomposition of acid sludge, means for converting sulfur dioxid into sulfuric anhydrid by catalysis, and connections whereby the aeriform products from the first mentioned means are delivered to said purifying means and the purified products from the latter are delivered to said catalyzing means, substantially as described.

49. Apparatus for utilizing the sulfur content of acid sludge for making sulfuric anhydrid, consisting of means for heating the sludge to effect its decomposition, means for purifying aeriform products from the decomposition of acid sludge, which means include appliances for bringing said products into contact with a solvent of hydrocarbons that are not readily condensable in order to remove constituents absorbable by said solvent, means for converting sulfur dioxid into sulfuric anhydrid, and connections whereby the aeriform products from the first mentioned means are delivered to said purifying means and the purified products from the latter are delivered to said catalyzing means, substantially as described.

50. Apparatus for utilizing the sulfur content of acid sludge for making sulfuric anhydrid, consisting of means for heating the sludge to effect a partial decomposition of it and for washing liquid hydrocarbons out of the residual sludge and for heating the latter to effect its decomposition, means for purifying aeriform products from the decomposition of acid sludge, means for converting sulfur dioxid into sulfuric anhydrid, and connections whereby the aeriform products from at least the second mentioned decomposition are delivered to said purifying means and the purified products are delivered to said catalyzing means, substantially as described.

51. Apparatus for utilizing the sulfur content of acid sludge for making sulfuric anhydrid, consisting of means for heating the sludge in presence of a solvent of hydrocarbons to effect a partial decomposition of said sludge and for separating said solvent with the hydrocarbons in solution therein from the residual sludge and for heating said residual sludge to effect its decomposition, means for purifying aeriform products from the decomposition of acid sludge, means for converting sulfur dioxid into sulfuric anhydrid, and connections whereby the aeriform products from at least the second mentioned decomposition are delivered to said purifying means and the purified products are delivered to said catalyzing means, substantially as described.

52. Apparatus for utilizing the sulfur content of acid sludge for making sulfuric anhydrid, consisting of means for heating the sludge in presence of a solvent of hydrocarbons to effect a decomposition of said sludge and for withdrawing the solvent during said decomposition and with it the hydrocarbons in solution therein, means for purifying aeriform products from the decomposition of acid sludge, means for converting sulfur dioxid into sulfuric anhydrid, and connections whereby the aeriform products from the first mentioned decomposition are delivered to said purifying means and the purified products are delivered to said catalyzing means, substantially as described.

53. Apparatus for utilizing the sulfur content of acid sludge, consisting of means for subjecting the sludge to contact with air at a decomposing temperature, and means, including necessary connections, for subjecting the resulting aeriform products to operations for purifying the same and for utilizing sulfur dioxid therein, substantially as described.

54. Apparatus for utilizing the sulfur content of acid sludge, consisting of means for subjecting the sludge to a decomposing temperature in the presence of air introduced into a body of the liquid sludge below the surface thereof, and means, including necessary connections, for subjecting the resulting aeriform products to operations for purifying the same and for utilizing sulfur dioxid therein, substantially as described.

55. Apparatus for utilizing the sulfur content of acid sludge, consisting of means for heating the sludge to effect its decomposition, and means, including necessary connections, for subjecting the resulting aeriform products to operations for purifying the same and for utilizing sulfur dioxid therein, which purifying means include appliances for bringing said products into contact with a solvent of hydrocarbons that are not readily condensable in order to remove constituents absorbable by said solvent, substantially as described.

56. Apparatus for utilizing the sulfur content of acid sludge, consisting of means for heating the sludge to effect a partial decomposition of it and for washing liquid hydrocarbons out of the residual sludge and for heating the latter to effect its decomposition, and means, including necessary connections, for subjecting the aeriform products from at least the latter decomposition to operations for purifying the same and for utilizing sulfur dioxid therein, substantially as described.

57. Apparatus for utilizing the sulfur content of acid sludge, consisting of means for heating the sludge in presence of a solvent of hydrocarbons to effect a partial decomposition of said sludge and for separating said solvent with the hydrocarbons in solution therein from the residual sludge and for heating the latter to effect its decomposition, and means, including necessary connections, for subjecting aeriform products from at least the latter decomposition to operations for purifying the same and for utilizing sulfur dioxid therein, substantially as described.

58. Apparatus for utilizing the sulfur content of acid sludge, consisting of means for heating the sludge in presence of a solvent of hydrocarbons to effect a decomposition of said sludge and for withdrawing the solvent during said decomposition and with it the hydrocarbons in solution therein, and means, including necessary connections, for subjecting aeriform products of said decomposition to operations for purifying the same and for utilizing sulfur dioxid therein, substantially as described.

59. Apparatus for making sulfur dioxid, consisting of means for subjecting acid sludge to contact with air at a decomposing temperature, means for purifying aeriform products from the decomposition of acid sludge, connections whereby the aeriform products from the first mentioned means are delivered to said purifying means, and connections for collecting the purified products in a manner appropriate for utilizing their content of sulfur dioxid, substantially as described.

60. Apparatus for making sulfur dioxid, consisting of means for subjecting acid sludge to a decomposing temperature in the presence of air introduced into a body of the liquid sludge below the surface thereof, means for purifying aeriform products from the decomposition of acid sludge, connections whereby the aeriform products from the first mentioned means are delivered to said purifying means, and connections for collecting the purified products in a manner appropriate for utilizing their content of sulfur dioxid, substantially as described.

61. Apparatus for making sulfur dioxid, consisting of means for heating acid sludge to effect its decomposition, means for purifying aeriform products from the decomposition of acid sludge, which purifying means include appliances for bringing the products into contact with a solvent of hydrocarbons that are not readily condensable in order to remove constituents absorbable by said solvent, connections whereby the aeriform products from the first mentioned means are delivered to said purifying means, and connections for collecting the purified products in a manner appropriate for utilizing their content of sulfur dioxid, substantially as described.

62. Apparatus for making sulfur dioxid, consisting of means for heating acid sludge to effect a partial decomposition of it and for washing liquid hydrocarbons out of the residual sludge and for heating the latter to effect its decomposition, means for purifying aeriform products from the decomposition of acid sludge, connections whereby the aeriform products from at least the second mentioned decomposition are delivered to said purifying means, and connections for collecting the purified products in a manner appropriate for utilizing their content of sulfur dioxid, substantially as described.

63. Apparatus for making sulfur dioxid, consisting of means for heating acid sludge in presence of a solvent of hydrocarbons to effect a partial decomposition of said sludge and for separating said solvent with the hydrocarbons in solution therein from the residual sludge and for heating the latter to effect its decomposition, means for purifying aeriform products from the decomposition of acid sludge, connections whereby the aeriform products from at least the second mentioned decomposition are delivered to said purifying means, and connections for collecting the purified products in a manner appropriate for utilizing their content of sulfur dioxid, substantially as described.

64. Apparatus for making sulfur dioxid, consisting of means for heating acid sludge in presence of a solvent of hydrocarbons to effect a decomposition of said sludge and for withdrawing the solvent during said decomposition and with it the hydrocarbons in solution therein, means for purifying aeriform products from the decomposition of acid sludge, connections whereby the aeriform products of said decomposition are delivered to said purifying means, and connections for collecting the purified products in a manner appropriate for utilizing their content of sulfur dioxid, substantially as described.

65. Apparatus for making sulfur dioxid, consisting of means for subjecting the sludge to contact with air at a decomposing temperature, and connections for collecting the aeriform products in a manner appropriate for utilizing their content of sulfur dioxid, substantially as described.

66. Apparatus for making sulfur dioxid, consisting of means for subjecting the sludge to a decomposing temperature in the presence of air introduced into a body of the liquid sludge below the surface thereof, and connections for collecting the aeriform products in a manner appropriate for utilizing their content of sulfur dioxid, substantially as described.

67. Apparatus for making sulfur dioxid, consisting of means for heating acid sludge to effect a partial decomposition of it and for washing liquid hydrocarbons out of the residual sludge and for heating the latter to effect its decomposition, and connections for collecting the aeriform products from at least the second mentioned decomposition in a manner appropriate for utilizing their content of sulfur dioxid, substantially as described.

68. Apparatus for making sulfur dioxid, consisting of means for heating acid sludge in presence of a solvent of hydrocarbons to effect a partial decomposition of said sludge and for separating said solvent with the hydrocarbons in solution therein from the residual sludge and for heating the latter to effect its decomposition, and connections for collecting the aeriform products from at least the second mentioned decomposition in a manner appropriate for utilizing their content of sulfur dioxid, substantially as described.

69. Apparatus for making sulfur dioxid, consisting of means for heating acid sludge in presence of a solvent of hydrocarbons to effect a decomposition of said sludge and for withdrawing the solvent during said decomposition and with it the hydrocarbons in solution therein, and connections for collecting the aeriform products of said decomposition in a manner appropriate for utilizing their content of sulfur dioxid, substantially as described.

70. Apparatus for separating components of acid sludge from each other, consisting of means for heating the sludge to effect its decomposition, means for subjecting aeriform products to operations which include contact with a solvent of hydrocarbons that are not readily condensable, and connections whereby the aeriform products from the first mentioned means are delivered to the second mentioned means, substantially as described.

71. Apparatus for separating components of acid sludge from each other, consisting of means for heating the sludge in presence of a solvent of hydrocarbons to effect a decomposition of said sludge and for withdrawing the solvent during said decomposition and with it the hydrocarbons in solution therein, substantially as described.

72. The process of making a sulfur bearing gas utilizable for its sulfur content, by heating sulfur bearing oily material to evolve aeriform products, subjecting such products evolved below 500° F. to purifying operations which include contact with a solvent of hydrocarbons that are not readily condensable in order to remove constituents absorbable by said solvent, and collecting the purified products in a manner appropriate for utilizing their content of sulfur, substantially as described.

73. The process of utilizing the sulfur content of acid sludge for making sulfuric anhydrid, by heating the sludge in presence of a solvent of hydrocarbons to effect a partial decomposition of the sludge, separating said solvent with the hydrocarbons in solution therein from the residual sludge, subjecting the latter to contact with air at a decomposing temperature, purifying the aeriform products from both decompositions by operations which include contact of them with a solvent of hydrocarbons that are not readily condensable in order to remove constituents absorbable by said solvent, and passing the purified products over catalytic material for converting sulfur dioxid into sulfuric anhydrid, substantially as described.

74. Apparatus for utilizing the sulfur content of acid sludge for making sulfuric anhydrid, consisting of means for heating the sludge in presence of a solvent of hydrocarbons to effect a partial decomposition of said sludge and for separating said solvent with the hydrocarbons in solution therein from the residual sludge and for subjecting the latter to air at a decomposing temperature, means for purifying aeriform products from the decomposition of acid sludge by operations which include contact of them with a solvent of hydrocarbons that are not readily condensable in order to remove constituents absorbable by said solvent, means for catalytically converting sulfur dioxid into sulfuric anhydrid, and connections whereby the aeriform products from both decompositions are delivered through said purifying means to said catalyzing means, substantially as described.

75. The process of utilizing the sulfur content of acid sludge for making sulfuric anhydrid, by heating the sludge in presence of a solvent of hydrocarbons to effect a partial decomposition of the sludge at a temperature too low to drive off the hydrocarbons formed by the decomposition, withdrawing the solvent during said decomposition and with it the hydrocarbons in solution therein, heating the residual sludge from which hydrocarbons have thus been washed to a decomposing temperature not above 425° F. in a vessel of elliptical cross section with the major axis of the ellipse vertical, which vessel is only partly occupied by the body of sludge undergoing decomposition, introducing air into the body of said residual sludge below the surface of the sludge in said elliptical vessel at said decomposing temperature and under partial vacuum in the upper part of said vessel, subjecting aeriform products thus evolved below 500° F. and derived from both decompositions to purifying operations which include contact of said products with a solvent of hydrocarbons that are not readily condensable in order to remove constituents absorbable by said solvent, and passing the purified products over catalytic material for converting sulfur dioxid into sulfuric anhydrid, substantially as described.

76. Apparatus for utilizing the sulfur content of acid sludge for making sulfuric anhydrid, consisting of means for heating the sludge in presence of a solvent of hydrocarbons to effect a partial decomposition of said sludge at a temperature too low to drive off the hydrocarbons formed by the decomposition and for withdrawing said solvent during said decomposition and with it the hydrocarbons in solution therein, means for heating the residual sludge from which hydrocarbons have thus been washed to a decomposing temperature not above 425° F. in a vessel of elliptical cross section with the major axis of the ellipse vertical, which vessel is arranged to be only partly occupied by the body of sludge undergoing decomposition, means for introducing air into the body of said residual sludge below the surface of the sludge in said elliptical vessel at said decomposing temperature and under partial vacuum in the upper part of said vessel, means for purifying aeriform products from the decomposition of acid sludge by operations which include contact of them with a solvent of hydrocarbons that are not readily condensable in order to remove constituents absorbable by said solvent, means for catalytically converting sulfur dioxid into sulfuric anhydrid, and connections whereby aeriform products evolved below 500° F. and derived from both decompositions are delivered through said purifying means to said catalyzing means, substantially as described.

In testimony whereof we affix our signatures in presence of two witnesses.

JOHN C. BLACK.
MARVIN L. CHAPPELL.

Witnesses:
H. E. AINE,
JAS. McMILLAN.